US010683876B2

(12) United States Patent
Brown et al.

(10) Patent No.: US 10,683,876 B2
(45) Date of Patent: Jun. 16, 2020

(54) FLUID MOVING APPARATUS AND SYSTEM FOR AN ELECTRIC SUBMERSIBLE GAS SEPARATOR

(71) Applicant: Halliburton Energy Services, Inc., Houston, TX (US)

(72) Inventors: Donn J. Brown, Broken Arrow, OK (US); Trevor A. Kopecky, Owasso, OK (US); Thomas John Gottschalk, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 77 days.

(21) Appl. No.: 16/025,888

(22) Filed: Jul. 2, 2018

(65) Prior Publication Data

US 2019/0017518 A1    Jan. 17, 2019

Related U.S. Application Data

(60) Provisional application No. 62/531,689, filed on Jul. 12, 2017.

(51) Int. Cl.
| | |
|---|---|
| *F04D 31/00* | (2006.01) |
| *F04D 29/18* | (2006.01) |
| *F04D 9/00* | (2006.01) |
| *E21B 43/12* | (2006.01) |
| *F04D 29/54* | (2006.01) |

(Continued)

(52) U.S. Cl.
CPC ......... *F04D 31/00* (2013.01); *B01D 19/0052* (2013.01); *B01D 19/0057* (2013.01); *E21B 43/128* (2013.01); *E21B 43/38* (2013.01); *F04D 9/001* (2013.01); *F04D 13/10* (2013.01); *F04D 29/183* (2013.01); *F04D 29/548* (2013.01)

(58) Field of Classification Search
CPC ........ F04D 31/00; F04D 13/08; F04D 13/086; F04D 13/10; F04D 29/548; F04D 9/001; F04D 29/183; B01D 19/0052; B01D 19/0057; E21B 43/38; E21B 43/128; F03B 13/02

See application file for complete search history.

(56) References Cited

U.S. PATENT DOCUMENTS

| 8,162,600 B2 | 4/2012 | Brown | |
| 9,624,930 B2 * | 4/2017 | Gahlot | .................... F04D 7/045 |

(Continued)

*Primary Examiner* — Igor Kershteyn
*Assistant Examiner* — Danielle M. Christensen
(74) *Attorney, Agent, or Firm* — McGuireWoods LLP (57) ABSTRACT

A fluid moving system and apparatus for an electric submersible pump (ESP) is described. A fluid moving system includes a gas separator between an electric submersible pump and an ESP motor, the gas separator including a separation chamber including an impeller and a diffuser, the impeller including a plurality of regressively pitched main vanes interspersed between a plurality of mixer vanes, each of the plurality of main and mixer vanes extending along the hub with a positive slope and a concave top face, and a diffuser, the diffuser including blades extending along a diffuser body in a sloped direction substantially opposite the slope of the impeller main vanes, the blades having a concave top face and a regressive pitch that mirrors the pitch of the impeller main vanes, wherein the impeller vanes and diffuser blades serve to homogenize the well fluid while facilitating downstream movement.

19 Claims, 11 Drawing Sheets

(51) Int. Cl.
*B01D 19/00* (2006.01)
*F04D 13/10* (2006.01)
*E21B 43/38* (2006.01)

(56) References Cited

U.S. PATENT DOCUMENTS

2014/0050570 A1\* 2/2014 Jayaram .................. F04D 13/08
 415/169.1
2015/0044027 A1\* 2/2015 Van Dam .............. F04D 29/183
 415/73

\* cited by examiner

ND SYSTEM
FLUID MOVING APPARATUS AND SYSTEM FOR AN ELECTRIC SUBMERSIBLE GAS SEPARATOR

BACKGROUND OF THE INVENTION

Field of the Invention

Embodiments of the invention described herein pertain to the field of gas separators for electric submersible pumps. More particularly, but not by way of limitation, one or more embodiments of the invention enable a fluid moving apparatus and system for an electric submersible gas separator.

Description of the Related Art

Fluid, such as gas, oil or water, is often located in underground formations. In such situations, the fluid must be pumped to the surface so that it can be collected, separated, refined, distributed and/or sold. Centrifugal pumps are typically used in electric submersible pump (ESP) applications for lifting well fluid to the surface. Centrifugal pumps impart energy to a fluid using a rotating impeller paired with a stationary diffuser, together referred to as a "stage." Multistage centrifugal pumps use several stages of impeller and diffuser pairs to further increase the pressure lift.

One challenge to economic and efficient ESP operation is pumping gas laden fluid. When pumping gas laden fluid, the gas may separate from the other fluid due to the pressure differential created when the pump is in operation. If there is a sufficiently high gas volume fraction (GVF), typically about 10% or more, the pump may experience a decrease in efficiency and decrease in capacity or head (slipping). If gas continues to accumulate on the bottom of the impeller it may entirely block the passage of other fluid through the centrifugal pump. When this occurs the pump is said to be "gas locked" since proper operation of the pump is impeded by the accumulation of gas.

ESPs sometimes include a gas separator upstream of the centrifugal pump, in an attempt to separate this gas out of the multi-phase fluid. The two most common types of gas separator are vortex type and rotary type separators. Both vortex and rotary type separators separate the well fluid centrifugally before it enters the pump. Such centrifugal separation induces higher-density, gas poor fluid outward, while the lower density, gas rich fluid moves inward near the shaft. Next, the fluid travels to a crossover, which physically partitions the higher-density, gas poor fluid and the lower density, gas rich fluid. The crossover vents the lower density, gas rich fluid to the casing annulus surrounding the ESP assembly while channeling the higher-density, gas poor fluid into the centrifugal pump.

Upon entering the assembly gas separator, well fluid must gain sufficient momentum to travel through the long separation chamber of the separator, and continue through the crossover passages. A fluid moving device is typically included in the separation chamber to facilitate the flow of well fluid through the gas separator. Conventional gas separators use a helical auger to facilitate this flow of well fluid. However, augers are inefficient fluid movers and are therefore not ideal to impart momentum to the multiphase fluid. It has also been proposed to employ a traditional centrifugal pump stage inside a separation chamber in order to impart momentum to fluid moving through the separation chamber. While traditional impeller-diffuser moving devices better impart momentum to production fluid than an auger, conventional stages are susceptible to gas lock and thus are not appropriate for use inside a gas separator in high GVF applications where gas bubbles are likely to form.

As is apparent from the above, currently available fluid movers are not appropriate to move fluid with a high GVF through ESP gas separators. Therefore, there is a need for an improved fluid moving apparatus and system for an electric submersible gas separator.

BRIEF SUMMARY OF THE INVENTION

One or more embodiments of the invention enable a fluid moving apparatus and system for an electric submersible gas separator. An illustrative embodiment of a fluid moving apparatus for an electrical submersible gas separator includes a rotatable shaft extending longitudinally through the gas separator, an impeller coupled to the shaft so as to rotate with the shaft inside a separation chamber of the gas separator, the impeller including a funnel-shaped hub secured to the shaft, a plurality of impeller vanes, each of the plurality of impeller vanes having a concave top face tilted inward toward the hub, the plurality of impeller vanes further including a plurality of main vanes extending along the hub with a first positive slope, the plurality of main vanes including a regressive pitch and a main vane chord length, the plurality of main vanes further including a cup on an outside edge of the leading edge, a plurality of mixer vanes interposed between the plurality of main vanes, each of the plurality of mixer vanes extending along the hub with a mixer vane chord length smaller than the main vane chord length, each mixer vane having a second positive slope larger than the first positive slope, each of the plurality of mixer vanes including a constant pitch, wherein the main vanes and mixer vanes alternate around the hub to form alternating acute angles between them, a non-rotatable diffuser paired to the impeller on a downstream side of the impeller, the diffuser including a body, the body including a central aperture, a wall circumferentially enclosing the body, and a plurality of diffuser blades extending radially between the body and the wall, the plurality of diffuser blades having a concave face tilted inward, the plurality of diffuser blades including a regressive pitch mirroring the regressive pitch of the main vanes, the diffuser blades extending along the body with a slope opposite the first positive slope. In some embodiments, there are a plurality of the impellers and a plurality of the diffusers on an upstream side of the separation chamber near an intake of the gas separator. In certain embodiments, two or more impeller-diffuser pairs are included in the separation chamber. In some embodiments, the separation chamber includes one of a vortex generator or a rotary generator. In certain embodiments, one of the vortex generator or the rotary generator is located downstream of the impeller and diffuser. In some embodiments, the fluid moving apparatus further includes a centrifugal pump fluidly coupled to the gas separator on a downstream side, wherein the centrifugal pump receives substantially homogenized well fluid from the gas separator.

A fluid moving system includes a gas separator between an electric submersible pump (ESP) and an ESP motor, the gas separator including a separation chamber including an impeller and a diffuser, the impeller including a plurality of regressively pitched main vanes interspersed between a plurality of mixer vanes, each of the plurality of main and mixer vanes extending along the hub with a positive slope and a concave top face, and a diffuser, the diffuser including blades extending along a diffuser body in a sloped direction substantially opposite the slope of impeller vanes, the blades having a concave top face and a regressive pitch substantially mirroring the pitch of the impeller main vanes. In some embodiments, the diffuser is above the impeller. In some embodiments, the impeller and diffuser facilitate downstream flow of well fluid through the separation chamber and crossover. In certain embodiments, the fluid moving system further includes a vortex generator downstream of the diffuser inside the separation chamber. In some embodiments, the impeller and diffuser homogenize the well fluid while facilitating downstream movement.

In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

Advantages of the present invention may become apparent to those skilled in the art with the benefit of the following detailed description and upon reference to the accompanying drawings in which.

While the invention is susceptible to various modifications and alternative forms, specific embodiments thereof are shown by way of example in the drawings and may herein be described in detail. The drawings may not be to scale. It should be understood, however, that the embodiments described herein and shown in the drawings are not intended to limit the invention to the particular form disclosed, but on the contrary, the intention is to cover all modifications, equivalents and alternatives falling within the scope of the present invention as defined by the appended claims.

DETAILED DESCRIPTION

A fluid moving apparatus and system for an electric submersible gas separator is described. In the following exemplary description, numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

As used in this specification and the appended claims, the singular forms "a", "an" and "the" include plural referents unless the context clearly dictates otherwise. Thus, for example, reference to a "vane" includes one or more vanes.

"Coupled" refers to either a direct connection or an indirect connection (e.g., at least one intervening connection) between one or more objects or components. The phrase "directly attached" means a direct connection between objects or components.

As used herein, the term "outer," "outside" or "outward" means the radial direction away from the center of the shaft of the ESP and/or the opening of a component through which the shaft would extend.

As used herein, the term "inner", "inside" or "inward" means the radial direction toward the center of the shaft of the ESP and/or the opening of a component through which the shaft would extend.

As used herein the terms "axial", "axially", "longitudinal" and "longitudinally" refer interchangeably to the direction extending along the length of the shaft of an ESP assembly component such as an ESP intake, multi-stage centrifugal pump, seal section, gas separator or charge pump.

"Downstream" refers to the direction substantially with the principal flow of working fluid when the pump assembly is in operation. By way of example but not limitation, in a vertical downhole ESP assembly, the downstream direction may be towards the surface of the well. The "top" of an element refers to the downstream-most side of the element.

"Upstream" refers to the direction substantially opposite the principal flow of working fluid when the pump assembly is in operation. By way of example but not limitation, in a vertical downhole ESP assembly, the upstream direction may be opposite the surface of the well. The "bottom" of an element refers to the upstream-most side of the element.

"Pitch" refers to the angle formed between a vane and impeller hub or blade and diffuser body at a particular point along the vane or blade, where the maximum pitch refers to a vane or blade extending normally from the hub or body and the minimum pitch refers to a vane or blade extending tangentially from the hub or body at the particular point.

"Regressive pitch" refers to pitch of a vane or blade that decreases in an axial direction from a leading edge to a trailing edge of the vane or from a bottom edge to a top edge of the blade.

"Constant pitch" refers to a vane or blade pitch that is substantially constant or constant in the axial direction between a leading edge and a trailing edge of the vane or between a bottom edge and a top edge of the blade.

"Positive slope" refers to an impeller vane's inner edge that is angled upwards from the leading edge to the trailing edge. An impeller vane with a more positive slope may be angled more sharply toward a vertical axis.

"Homogenize" means, with respect to a fluid containing gas and liquid, to sufficiently reduce the size of gas bubbles in the fluid, such that the fluid acts substantially similar to a single-phase liquid as it moves through an ESP pump.

For ease of description, the illustrative embodiments described herein are described in terms of a downhole ESP assembly having a vortex type gas separator. However, illustrative embodiments may be applied to any gas separator moving multi-phase fluid and/or at risk of gas locking or slipping. As may be appreciated by those of skill in the art, the fluid moving system of illustrative embodiments may be equally applied inside the separation chamber of a rotary type gas separator, for example upstream of the rotary paddle.

Illustrative embodiments may homogenize well fluid entering a gas separator while providing the well fluid axial momentum to travel downstream through the separation chamber of the gas separator. Illustrative embodiments may serve to greatly reduce the possibility of gas blockage and gas lock inside the gas separator over conventional fluid movers. By providing more homogenous fluid to the inducer or rotor of a gas separator of illustrative embodiments, the efficiency of the gas separation process may be improved over conventional fluid movers. Additionally, the homogenized fluid delivered to the pump may be better-quality fluid and thus be more easily lifted, which may increase the production rate of the ESP assembly while minimizing the likelihood of gas lock in the pump.

Illustrative embodiments may include a fluid moving stage made up of a rotating impeller paired with a stationary diffuser. The impeller may include a funnel-shaped hub with radially extending impeller vanes having concave top surfaces tilted inward. The impeller vanes of illustrative embodiments may include mixer vanes interposed between main vanes, which mixer vanes are shorter than the main vane, when a chord length of the vanes are measured from the leading edge to the trailing edge of the vane, thus providing the impeller with vanes of alternating length. The main impeller vanes may curve as the main vanes extend axially along the funnel-shaped hub with a positive slope and regressive pitch. The regressive pitch may provide each main impeller vane with a "twisted" shape having a top surface that tilts increasingly inward as the vane progresses from the leading edge to the trailing edge. The mixer vanes may have a constant pitch and a positive slope, which positive slope is more positive than the main vanes' slope, the difference in slope between main vanes and mixer vanes resulting in alternating acute angles between mixer vanes and an adjacent main vanes. The diffuser of illustrative embodiments may include diffuser blades extending radially between a diffuser body and diffuser wall. The diffuser blades of illustrative embodiments may curve as the diffuser blades extend axially along the diffuser body with a pitch that mirrors that of the main vanes of the paired impeller and a slope that is opposite to the slope of the impeller vanes.

The axially curving and tangential component of the impeller vanes may redirect higher density, gas poor fluid inward towards the hub as the fluid moves upward. This inward flow of higher density, gas poor fluid may reduce the likelihood of gas locking by reducing buildup of lower density, gas rich fluid next to the hub, and also may homogenize the fluids by breaking up large gas bubbles and therefore make the gas-laden fluid more readily producible by the pump.

Figure 1:
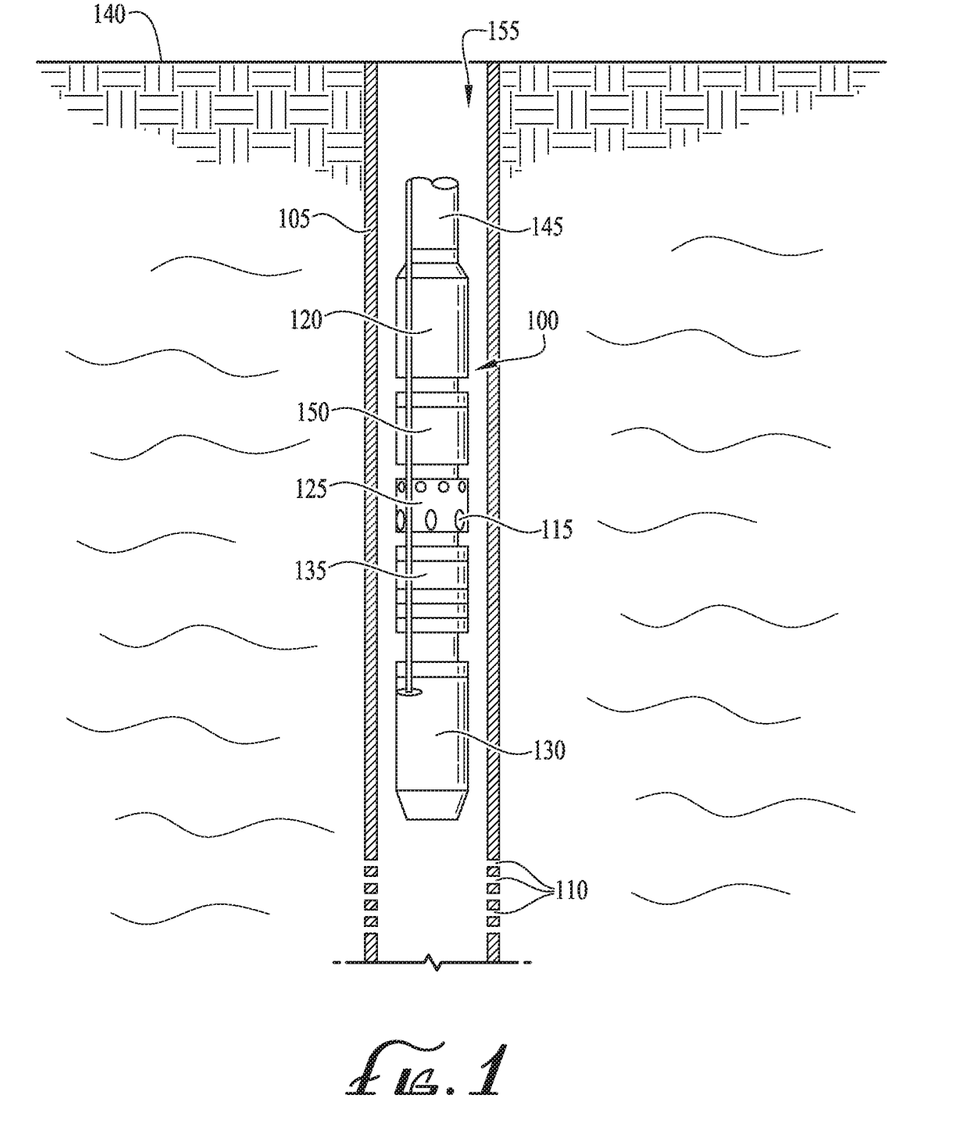
FIG. 1 is a perspective view of an electric submersible pump (ESP) assembly of an illustrative embodiment.

Illustrative embodiments may include an artificial lift assembly, such as an ESP assembly, which may be located downhole below the surface of the ground. FIG. 1 shows an exemplary ESP assembly 100. ESP assembly 100 may be positioned within well casing 105, which may separate ESP assembly 100 from an underground formation. Well fluid may enter casing 105 through perforations 110 and travel downstream to intake ports 115. Intake ports 115 may serve as the intake for ESP pump 120 and may be located on an ESP intake section or may be integral to gas separator 125. Gas separator 125 may be a vortex separator or a rotary separator and may serve to separate gas from the well fluid before it enters pump 120. Motor 130 may be an electric submersible motor that operates to turn ESP pump 120 and may, for example, be a two-pole, three-phase squirrel cage induction motor. Seal section 135 may be a motor protector, serving to equalize pressure and keep motor oil separate from well fluid. ESP pump 120 may be a multi-stage centrifugal pump and may lift fluid to surface 140. Production tubing 145 may carry pumped fluid to surface 140, and then into a pipeline, storage tank, transportation vehicle and/or other storage, distribution or transportation means. In some gassy applications, charge pump 150 may be included in ESP assembly 100, for example between gas separator 125 and centrifugal pump 120, as shown in FIG. 1.

Figure 2A:
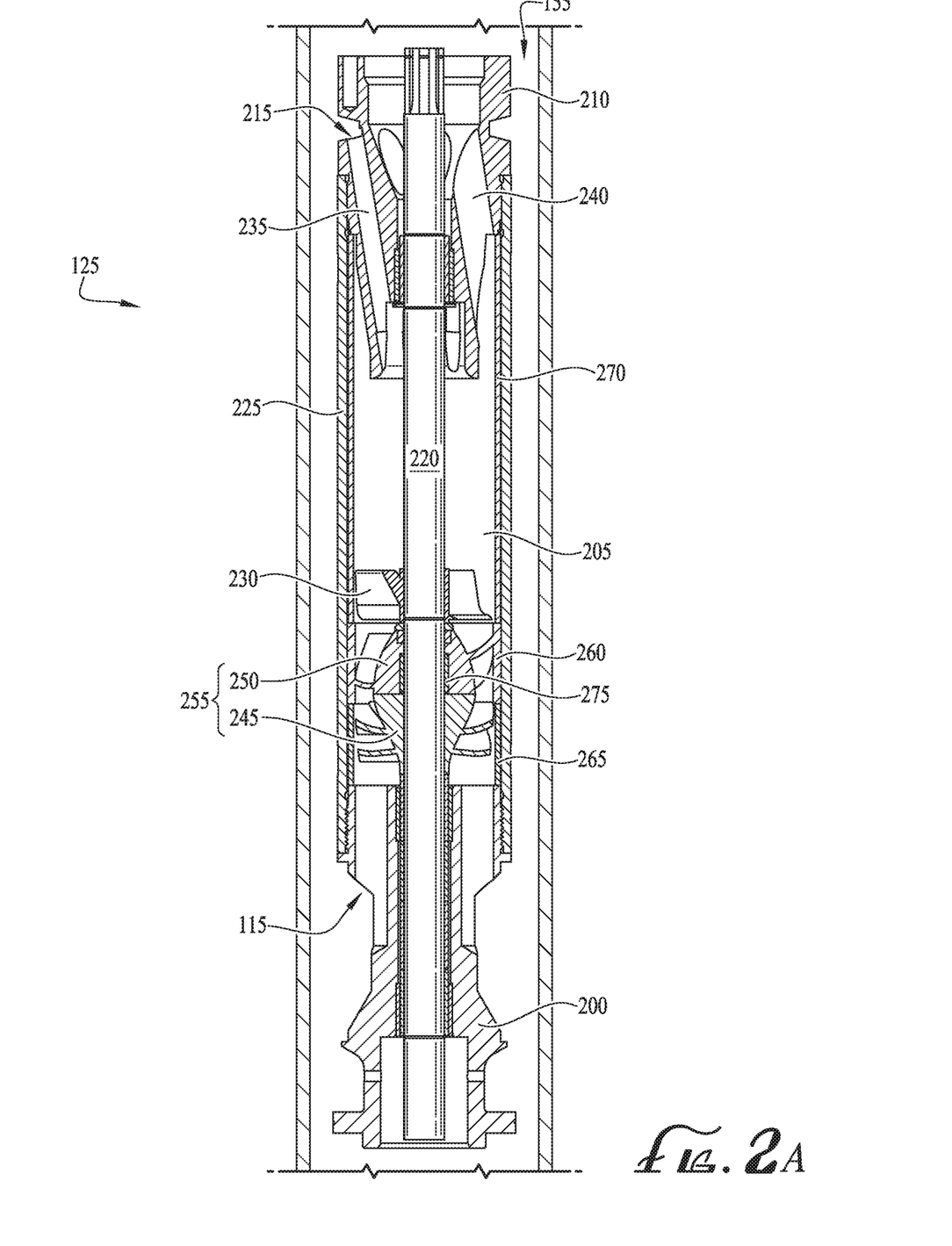
FIGS. 2A-2B are cross-sectional views of a gas separator of an illustrative embodiment.
Figure 2B:
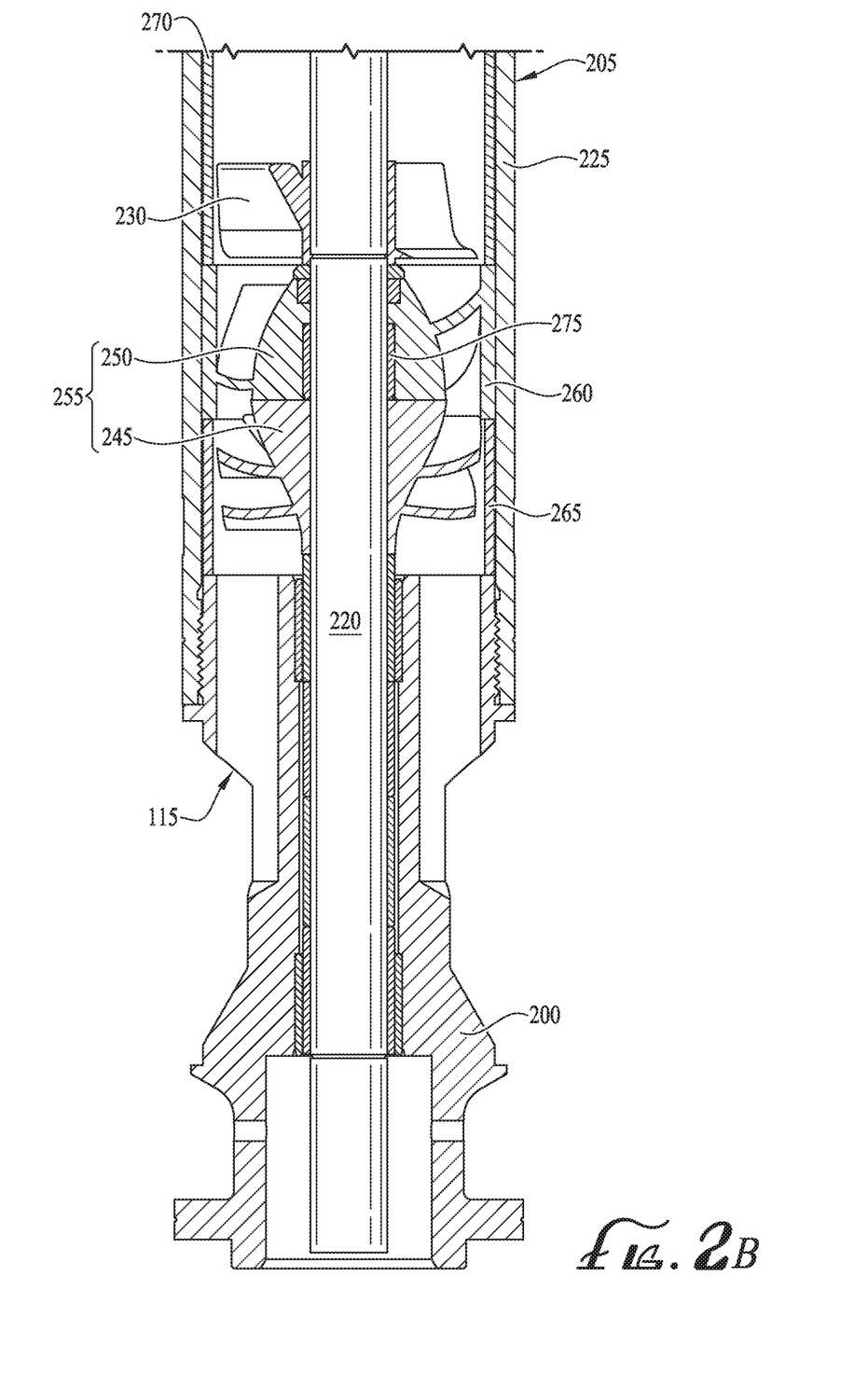

FIGS. 2A and 2B illustrate a gas separator 125 of an illustrative embodiment. As shown in FIG. 2A, gas separator 125 may include from upstream to downstream, intake section 200, separation chamber 205, and crossover 210. Inlet ports 115 may be spaced circumferentially around intake section 200 and serve as the intake for fluid into ESP assembly 100. Multi-phase well fluid may enter inlet ports 115 and travel downstream, through separation chamber 205 where lower density, gas rich fluid and higher density, gas poor fluid may be separated. From the separation chamber, the multi-phase fluid may proceed to crossover 210 where lower-density, gas rich fluid may be vented into casing annulus 155 while higher-density, gas poor fluid may continue to pump 120 with a lower GVF. Vent ports 215 may be spaced circumferentially around crossover 210 and provide a fluid connection between crossover 210 and casing annulus 155. Once separated from the bulk well fluid, the lower density, gas rich fluid may exit gas separator 125 and vent into casing annulus 155 by way of vent ports 215.

As shown in FIGS. 2A and 2B, shaft 220 may extend longitudinally and centrally through separation chamber 205 and crossover 210 and may be rotated by ESP motor 130. Separation chamber 205 may be a vortex-type chamber or a rotary-type chamber and may include housing 225 that defines the cavity forming separation chamber 205 and separates separation chamber 205 from casing annulus 155, as shown in FIG. 2A. Vortex generator 230 may be coupled to shaft 220 such that generator 230 rotates with shaft 220. Generator 230 may impart multi-phase well fluid with a vortex-shaped trajectory through a vortex-type separation chamber 205. One or more vortex generators 230 may be included in separation chamber 205. Multi-phase fluid may be separated inside separation chamber 205 into a higher-density, gas poor fluid stream and a lower-density, gas rich fluid stream. The lower density, gas rich stream may be guided inwards, towards shaft 220, before being vented from crossover 210 by way of vent passages 235. Alternatively, the higher-density, gas poor stream, which may be located outwards towards housing 225 of chamber 205, may be delivered to pump 120 by way of crossover 210 production passages 240, as shown in FIG. 2A.

Figure 3:
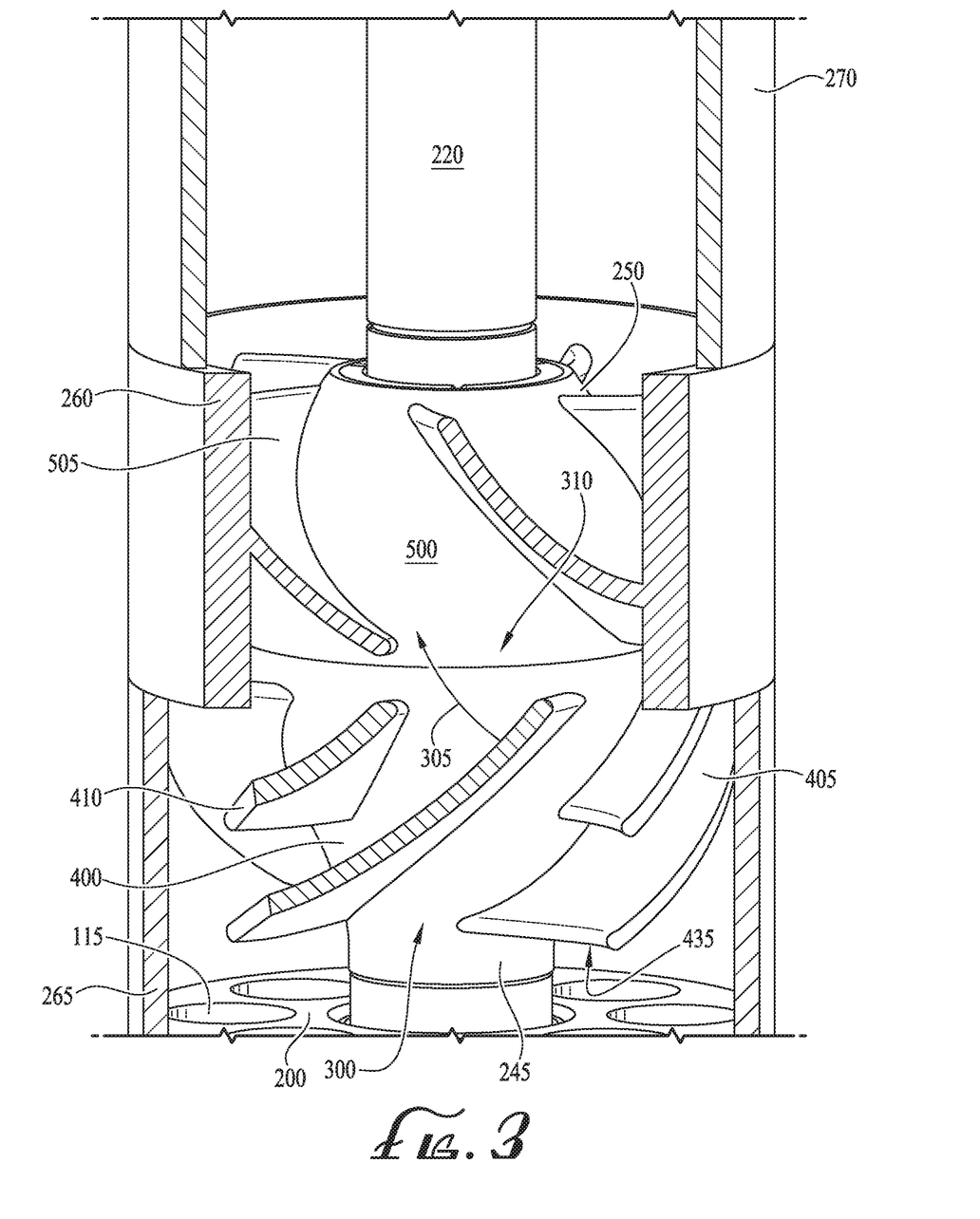
FIG. 3 is a perspective view of a fluid moving stage of an illustrative embodiment.

As shown in FIGS. 2A and 2B, gas separator 125 may include fluid moving stage 255, which comprises impeller 245 paired with diffuser 250. FIG. 3 illustrates a fluid moving stage 255 of illustrative embodiments. As shown in FIGS. 2A-3, fluid moving stage 255 may be located near an upstream end of separation chamber 205, for example near intake 200. In the example shown in FIGS. 2A-2B, a single fluid moving stage 255 is shown inside gas separator 125. In other embodiments, two, three, or more fluid moving stages 255, each made up of impeller 245 paired with diffuser 250, may be included in gas separator 125 and may be stacked and/or spaced out as needed along shaft 220. As shown in FIGS. 2A-3, liner 270 may line the inside diameter of housing 225 of separation chamber 205 so as to enclose vortex generator 230 and fluid inside separation chamber 205. Liner 270 should remain static during operation and may be axially aligned with diffuser wall 260. Liner 270 may be included on the inside diameter of housing 225 extending axially from the top of fluid moving stage 255 to the bottom of crossover 210.

Fluid moving stage 255 may include impeller 245 paired with diffuser 250. Impeller 245 may be coupled to shaft 220, by a bolted, press-fit, keyed and/or another similar connection, and may rotate with shaft 220. Diffuser 250 may be press-fit, threaded, and/or bolted into housing 225 above impeller 245 and should not rotate with shaft 220. Stationary sleeve 265 may surround impeller 245 on the inside diameter of housing 225 and may align axially with diffuser wall 260 and/or liner 270. During operation, impeller 245 may rotate inside stationary sleeve 265, while sleeve 265 remains stationary in housing 225. Stationary sleeve 265 may secure the axial position of diffuser 250 and/or may serve as a shroud for impeller 245.

Figure 4A:
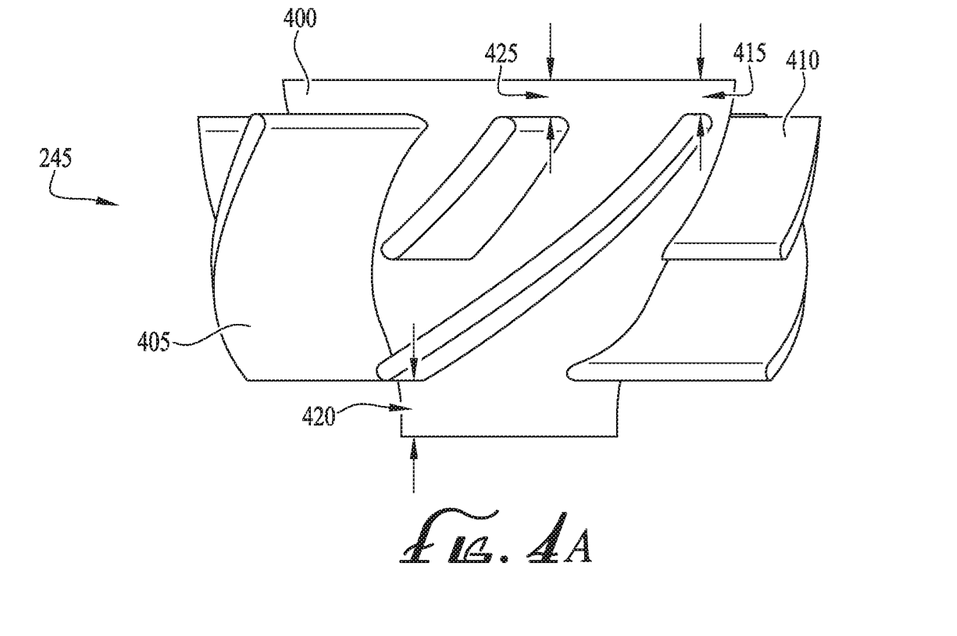
FIG. 4A is a side elevation view of an exemplary impeller of an illustrative embodiment.
Figure 4B:
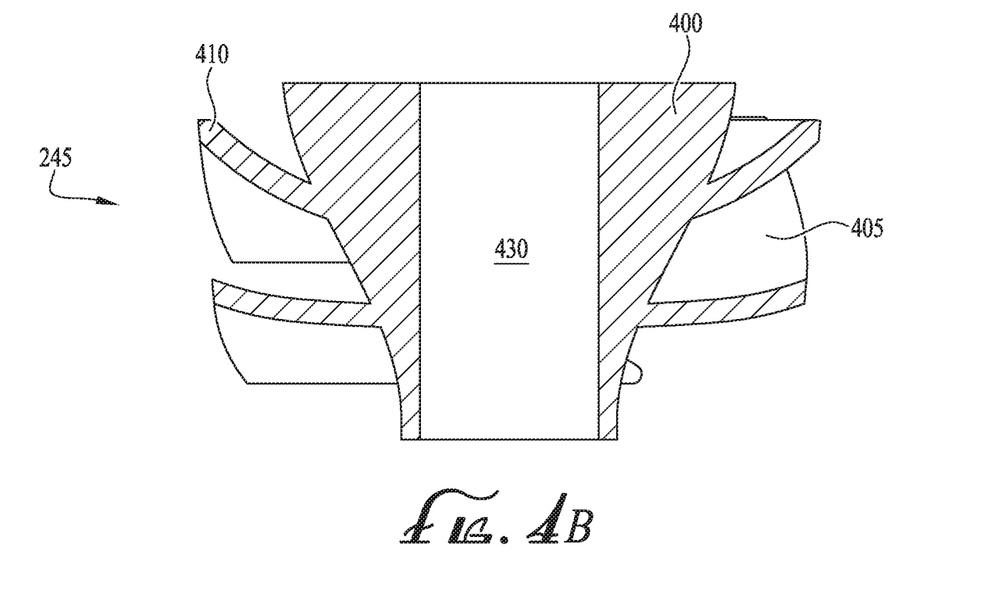
FIG. 4B is a cross-sectional view of an exemplary impeller of an illustrative embodiment.
Figure 4C:
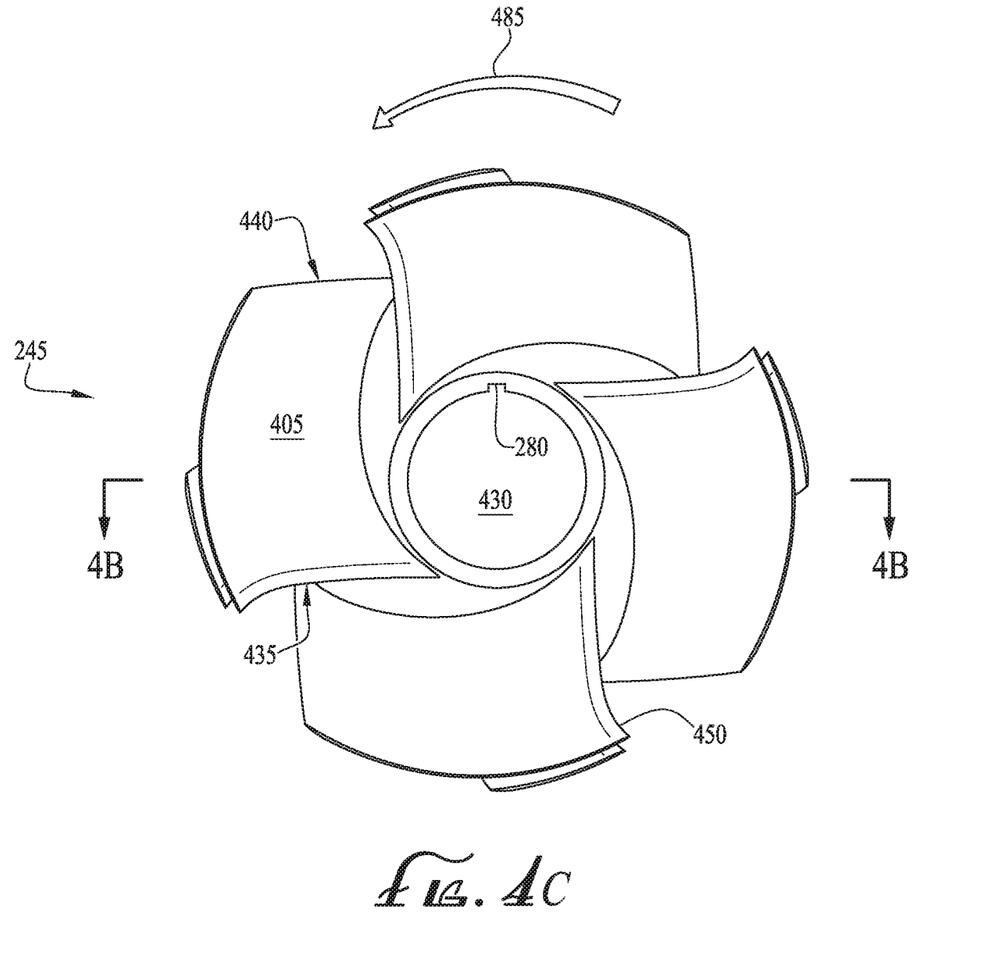
FIG. 4C is a bottom plan view of an exemplary impeller of an illustrative embodiment.
Figure 4D:
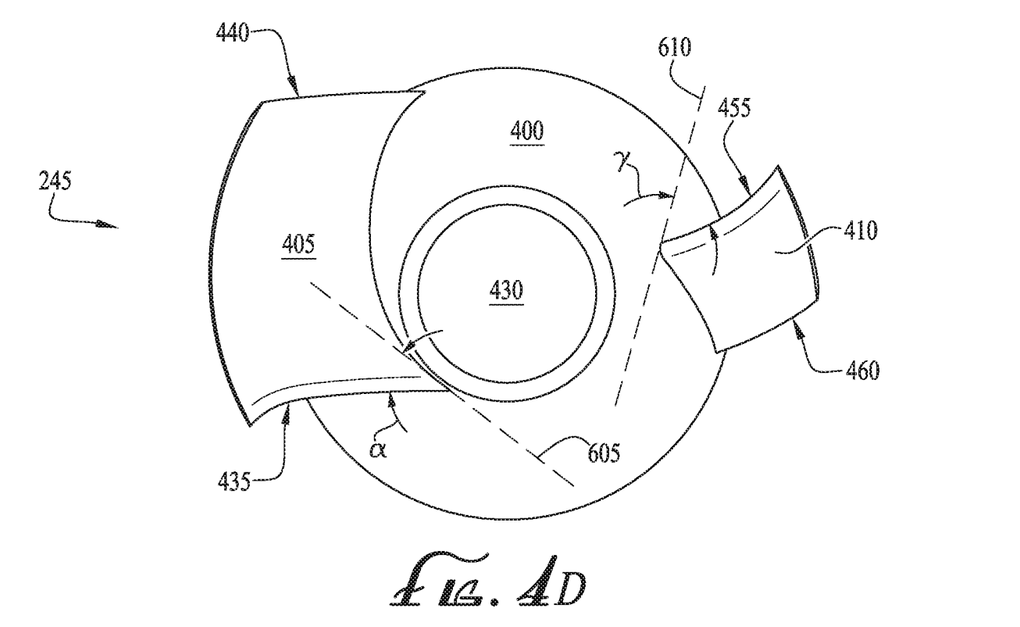
FIG. 4D is a bottom plan view of a hub and vanes of an exemplary impeller of an illustrative embodiment.
Figure 4E:
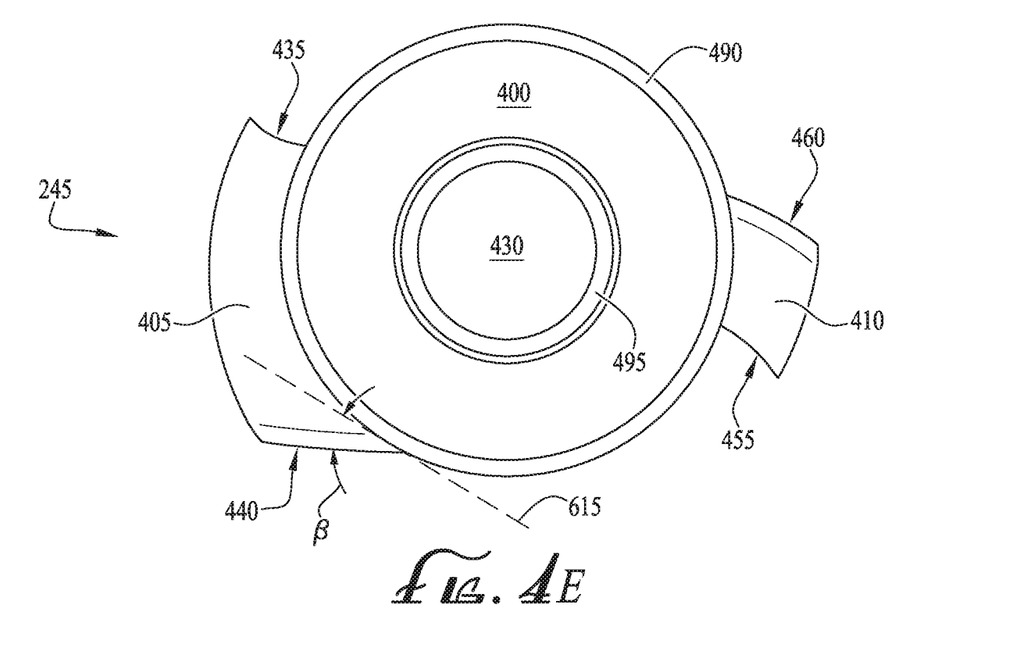
FIG. 4E is a top plan view of a hub and vanes of an exemplary impeller of an illustrative embodiment.

FIGS. 4A-4G illustrates an exemplary impeller 245 of illustrative embodiments. Impeller 245 may include hub 400, through which shaft 220 may extend. As shown in FIGS. 4A-4C, hub 400 may be funnel-shaped with a wider top and narrower bottom. The shape of hub 400 may provide beneficial hydraulic fluid moving effects to fluid moving through impeller 245. Central opening 430 may include the cylindrical space extending longitudinally through the center of impeller hub 400 and may allow shaft 220 to extend there through. In instance where impeller 245 is coupled to shaft 220 by a keyed connection, keyway 280 may extend axially along central opening 430 of hub 400. A key may sit, fit, and/or secure into the impeller keyway 280 and into a corresponding shaft 220 keyway. As a result, the key may transfer torque from shaft 220 to impeller 245 and allow impeller 245 to rotate with shaft 220. Turning to FIG. 4E, hub 400 may include balance ring 495 and outer ridge 490 extending axially from the top of hub 400. Outer ridge 490 may extend circumferentially around the outer diameter of hub 400 top while balance ring 495 may extend circumferentially around the outer diameter of the top of central opening 430 and/or the inner diameter of hub 400 top.

Impeller 245 may include a plurality of mixer vanes 410 interposed between a plurality of main vanes 405, which vanes 405, 410 extend radially from hub 400 and curve axially along hub 400. Four main vanes 405 and four mixer vanes 410 are shown in FIGS. 4A-4C, however, more or less of each vane 405, 410 may be employed such as three, five or six of each of main vane 405 and mixer vane 410. Main vanes 405 may curve in a crescent shape as main vanes 405 extend axially along hub 400. Each main vane 405 may extend axially for substantially the length of hub 400 and may be separated from the top of hub 400 by upper clearance 415 and from the bottom of hub 400 by lower clearance 420. Each mixer vane 410 may extend along hub 400 between two main vanes 415 and may be similarly curved to main vane 405, albeit extending for a shorter axial distance. Mixer vane 410 may be separated from the top of hub 400 by gap 425, which gap 425 may have a length similar to the length of upper clearance 415.

Mixer vanes 410 may be shorter than main vanes 405 measured by chord length from leading edge 435, 435 to trailing edge 440, 460 at the inner edge of each respective vane 405, 410. For example, each mixer vane 410's chord length may measure 40%, 50%, or 60% of main vane 405's chord length and/or may extend axially along hub 400 between the bottom of gap 425 to proximate or at the center of hub 400.

Figure 4F:
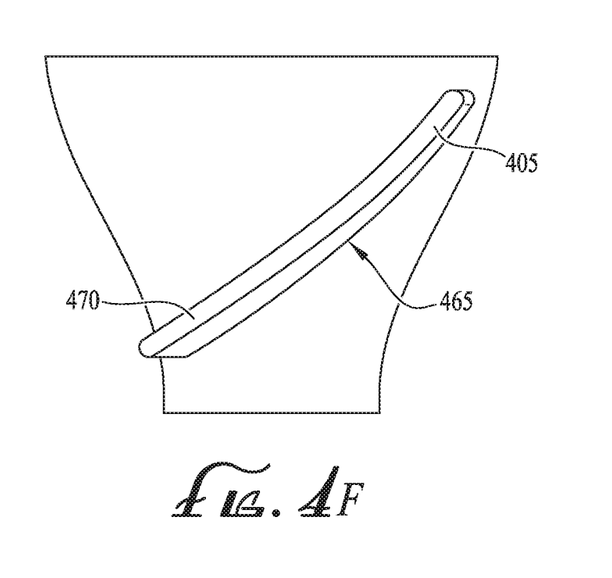
FIG. 4F is a side elevation view of a hub and main vane of an exemplary impeller of an illustrative embodiment.
Figure 4G:
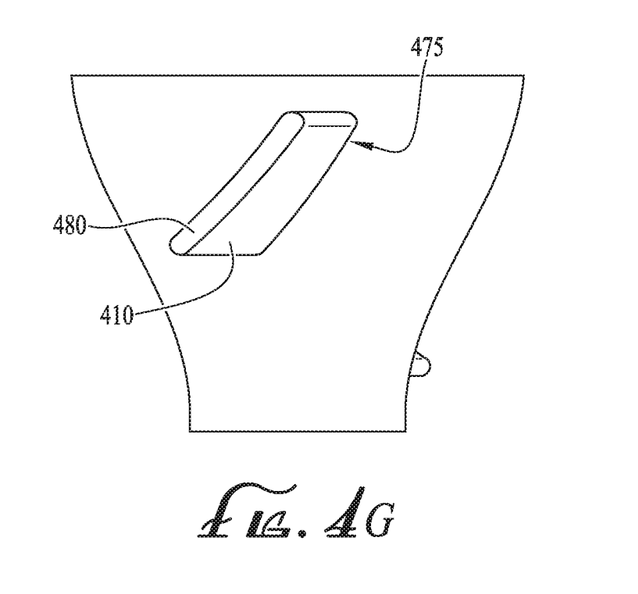
FIG. 4G is side elevation view of a hub and mixer vane of an exemplary impeller of an illustrative embodiment.

Referring to FIGS. 4C-4E, main vanes 405 may extend between main leading edge 435, near the top of hub 400, and main trailing edge 440, near the bottom of hub 400. Similarly, mixer vanes 410 may extend between mixer leading edge 455 on a top end and mixer trailing edge 460 on a bottom end. Mixer leading edge 455 may extend radially from near the top of hub 400 while mixer trailing edge 460 may extend from near the center of hub 400, when measured axially. Main leading edge 435 of each main vane 405 may be perpendicular to leading edges 435 of each adjacent main vane 405, and parallel to leading edge 435 of every second main vane 405. Main leading edge 435 of main vane 405 may extend radially outward from hub 400 to cup 450. Cup 450 may extend from the outer end of main leading edge 435 and provide main leading edge 435 with a curved shape facing partially concave downward and partially toward the main trialing edge 440 of an adjacent main vane 405. On the other hand, main trailing edge 440 may not be cupped and may extend from hub 400 substantially straight or with a slight curvature. Mixer leading edge 455 and mixer trailing edge 460 of mixer vane 410 may be straight, near straight, or slightly curved, for example curved similarly to main trailing edge 440. Turning to FIGS. 4F-4G, each main vane 405 may extend radially between main outer edge 470 and main inner edge 465, which main inner edge 465 is coupled to hub 400. Similarly, each mixer vane 410 may extend radially between mixer outer edge 480 and mixer inner edge 475, which mixer inner edge 475 is coupled to hub 400 between main inner edges 465 of adjacent main vanes 405. Vanes 405, 410 may curve axially along hub 400 such that inner edges 465, 475 are crescent or "C" shaped.

The fluid moving and homogenization capabilities of the impeller 245 of illustrative embodiments may be provided by the size, pitch, slope, and/or curve of impeller vanes 405, 410 as well as the relative differences in such features between main vanes 405 and mixer vanes 410. Referring to FIG. 3, the top surfaces of impeller vanes 405, 410 may have a concave shape that tilts inward toward hub 400. Upon rotation of impeller 245, the inward tilted vanes 405, 410 may direct higher density, gas poor fluid, which would otherwise tend to move outward, instead inward toward hub 400. The inward flow of higher density, gas poor fluid may reduce the buildup of lower density, gas rich fluid near hub 400, which may correspondingly homogenize the fluid and reduce the likelihood of gas lock in gas separator 125, thus making the gas-laden fluid more readily producible by pump 120. The concave top surface of each mixer vane 410 may have an inward tilt that is constant along its length. The top surface of main vanes 405 may have a regressive pitch that tilts main vane 405 increasingly inward as vane 405 progresses from leading edge 435 to trailing edge 440. The regressive pitch may give each main vane 405 a "twisted" shape.

The pitch of a section of impeller main vanes 405, for example near main leading edge 435 or near main trialing edge 440, may be measured relative to a tangential line crossing a particular point on hub 400, which particular point is located at the connection point of hub 400 and the section of main vane 405 being measured. Referring to FIGS. 4D-4E, the pitch of main leading edge 435 may be measured by leading angle α between main leading edge 435 and leading tangent line 605. Leading tangent line 605 may touch hub 400's outer diameter only at the point of connection between main leading edge 435 and hub 400 and without crossing over the outer diameter of hub 400. Similarly, the pitch of main trailing edge 440 may be measured by trailing angle β between main trailing edge 440 and trailing tangent line 610. Leading angle α may be larger than trailing angle β resulting in the regressive pitch and twisted shape of main vanes 405.

While the pitch of impeller main vanes 405 may vary in the axial direction, mixer vanes 410 may have a constant pitch or about constant pitch in the axial direction. Referring to FIG. 4D, the pitch of mixer vanes 410 may be equal or substantially similar at any point along mixer vane 410. The pitch of mixer vane 410 may be measured by mixer angle γ. Mixer angle γ is shown in between mixer tangent 615 and mixer leading edge 455 but an angle similar or equal to mixer angle γ may result from a similar measurement taken anywhere along mixer vane 410's inner edge 475. Mixer angle γ may be different than leading angle α and/or trailing angle β of main vanes 405. As a result, the length separating each mixer vane 410 and the adjacent twisted main vane 405 may vary axially and provide a fluid passage that induces homogenizing fluid turbulence.

With respect to the axial curvature of vanes 405, 410 along hub 400, vanes 405, 410 may slant diagonally as vanes 405, 410 extend axially along hub 400. Returning to FIGS. 4A-4B, main vane 405's inner edge 465 may extend diagonally upward with a positive slope from main leading edge 435 to main trailing edge 440. Similarly, mixer vanes 410 may have a positive slope with mixer inner edge 475 extending upward along hub 400 from mixer leading edge 455 to mixer trailing edge 460. However, mixer vanes 410 may extend with a more positive slope than that of main vanes 405 such that mixer vanes 410 are more closely aligned with a vertical and/or longitudinal axis than are main vanes 405. Since mixer vanes 410 are more positively sloped than main vanes 405, an acute angle may be formed between a mixer vane 410 and the main vane 410 facing mixer vane 410's bottom side. On the other hand, the same mixer vane 410 may form a non-acute and/or obtuse angle with the main vane 410 facing mixer vane 410's top side. As a result, impeller 245 of illustrative embodiments may include alternating acute angles between mixer vanes 410 and an adjacent main vane 405. The acute angles, through which well fluid may flow downstream, may induce fluid turbulence to beneficially homogenize the well fluid. Additionally, the larger positive slope of mixer vanes 410, relative to main vanes 405, may allow mixer vanes 410 to fragment passing well fluid, which may beneficially induce homogenizing turbulence and thus prevent and/or reduce the likelihood of gas lock inside gas separator Further, higher-density, gas poor fluid, which is prone to radially-outward movement during separation, may be pulled, forced, and/or swept radially-inward by the curved main vanes 405. The inward-directed higher density, gas poor fluid may reduce and/or prevent the buildup of lower density, gas rich fluid near hub 400, which may prevent gas lock in gas separator 125 while breaking up larger gas bubbles to beneficially homogenize the multi-phase fluid.

The diffuser 250 of illustrative embodiments may receive well fluid from impeller 245 and guide the fluid in a similar trajectory to that imparted on the fluid by impeller 245. In this way, the diffuser 250 of illustrative embodiments may enhance the homogenization of multi-phase fluid. Further, diffuser 250 may transform fluid velocity induced by impeller 245 into pressure head, thereby facilitating downstream flow. The slope, curve, and pitch of diffuser 250 blades may provide homogenization and/or fluid moving benefits. FIGS. 5A-5F illustrate an exemplary diffuser 250 of an illustrative embodiments. Diffuser 250 may include diffuser body 500 and diffuser wall 260, which diffuser wall 260 circumferentially encloses diffuser 250. Diffuser wall 260 may fit directly inside housing 225 with a threaded, bolted, friction-fit, or similar connection to prevent diffuser 250 from rotating with shaft 220. Diffuser body 500 may be shaped like an ellipsoid cut along a central minor axis and upper minor axis so as to form an upside-down bowl shape. Central aperture 520 may extend centrally and longitudinally through diffuser body 500 and allow shaft 220 to run through. A stationary bushing 275 may extend between shaft 220 and diffuser 250. In some embodiments, thrust rings may be included at the top and/or bottom of diffuser body 500. When installed inside separation chamber 205, diffuser wall 260 may extend axially over a top section of impeller 245 when impeller 245 is paired with diffuser 250 (shown in FIG. 3).

Turning to FIGS. 5A-5D, a plurality of diffuser blades 505 may extend radially from diffuser body 500 to diffuser wall 260. Five diffuser blades 505 are shown in FIGS. 5A-5D, however, more or less than five blades 505 may be employed such as three, four or six diffuser blades 505. Each diffuser blade 505 may extend axially between bottom side 515 and top side 510 of blade 505. Bottom side 515 may extend radially from near the bottom of diffuser body 500 to near the bottom of diffuser wall 260 while top side 510 may extend radially from near the top of diffuser body 500 to near the top of diffuser wall 260. Top side 510 may extend radially with a slight curve having a concave face directed toward the space directly above bottom side 515 of the same blade 505. On the other hand, bottom side 515 may extend in a halved "C" shape or wave crest shape with a larger curvature than top side 510 directed substantially in the same direction of top side 510's curve. Bottom side 515 may extend from near the bottom of body 500 with a straight or substantially straight shape but may be curved extending radially outward toward diffuser wall 260 so as to have a curvature varying in the radial direction. In this way, the outer edge of bottom side 515 may be not be radially aligned with the inner edge of bottom side 515. The curved nature of bottom side 515 may allow diffuser blade 505 to scoop and/or guide fluid flowing from impeller 245, for example shown by flow stream 305 in FIG. 3, through the cavities formed between adjacent diffuser blades 505.

Figure 5A:
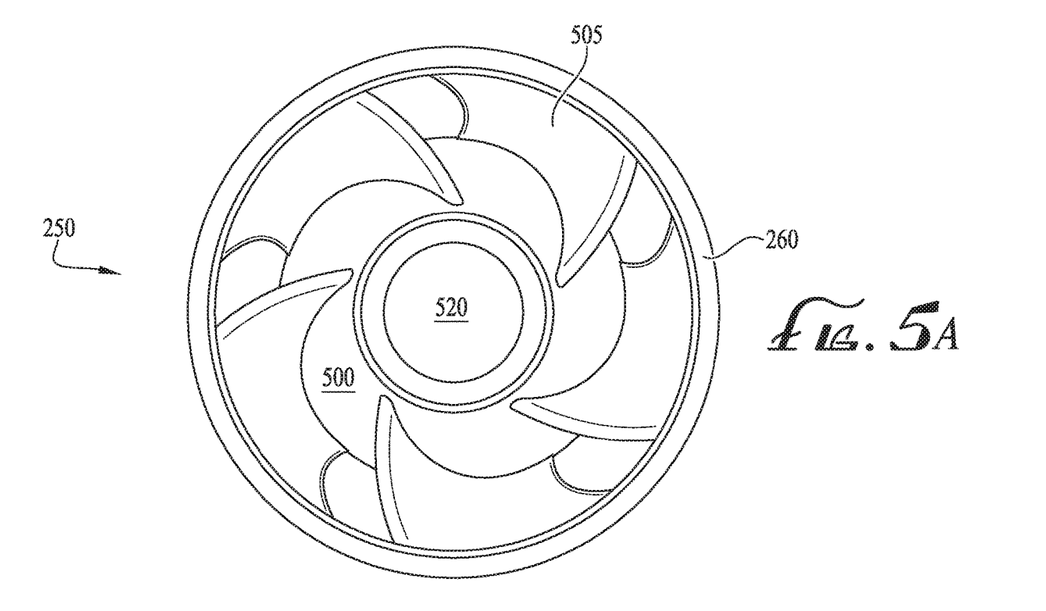
FIG. 5A is a top plan view of an exemplary diffuser of an illustrative embodiment.
Figure 5B:
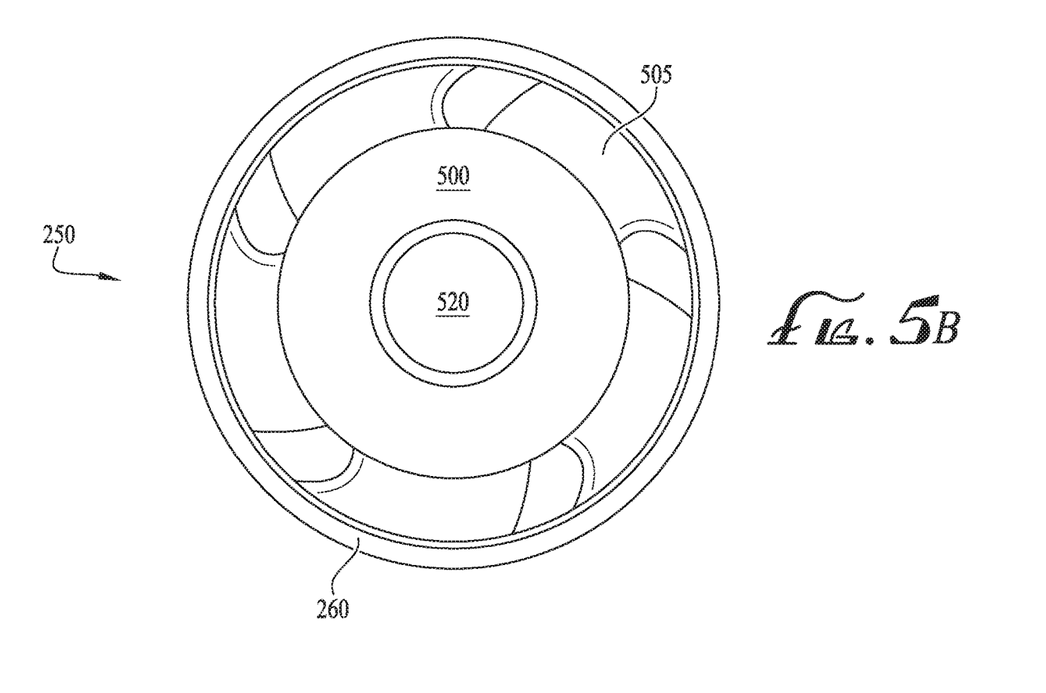
FIG. 5B is a bottom plan view of an exemplary diffuser of an illustrative embodiment.
Figure 5C:
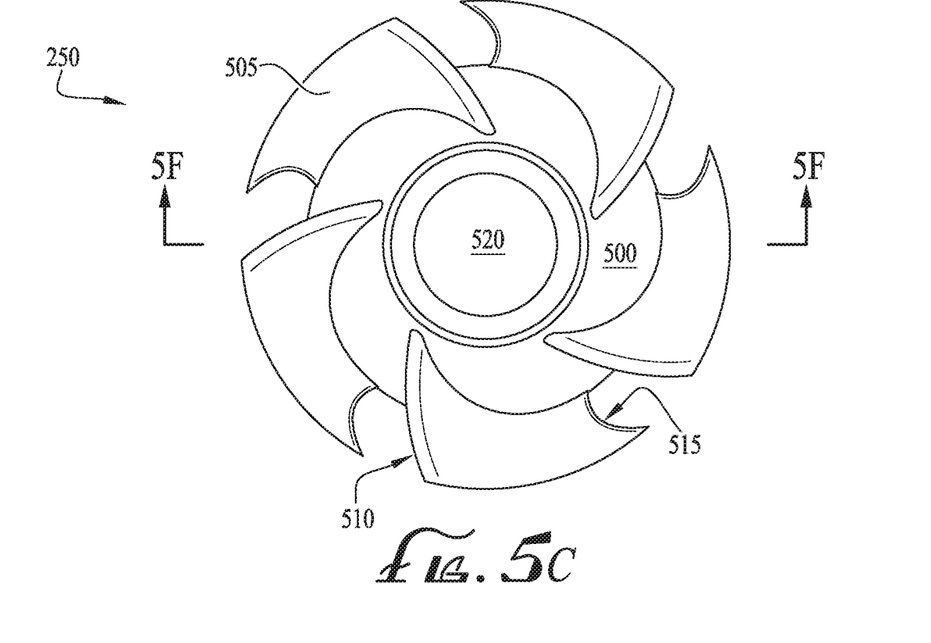
FIG. 5C is a top plan view of a diffuser body of an illustrative embodiment.
Figure 5D:
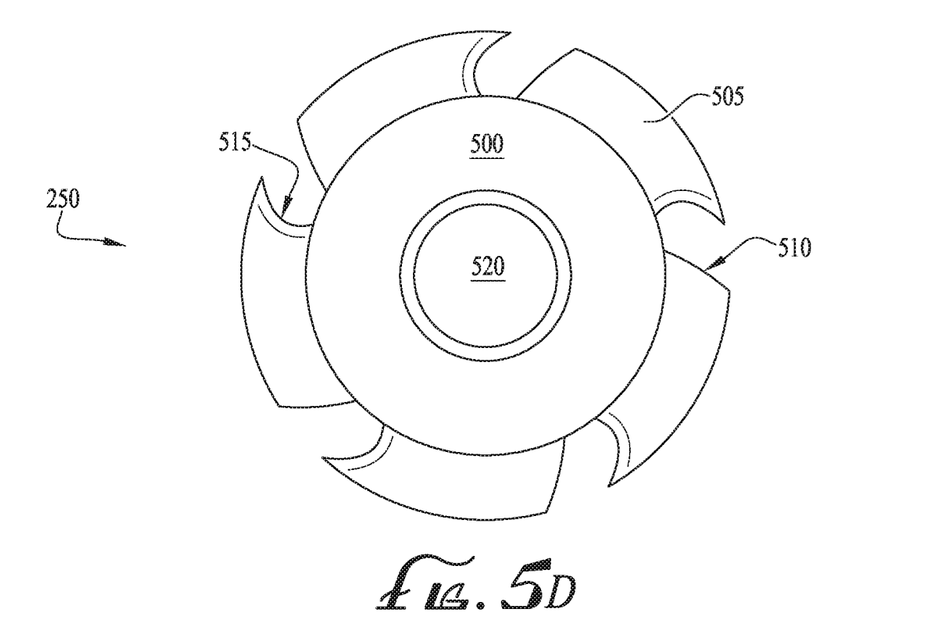
FIG. 5D is a bottom plan view of a diffuser body of an illustrative embodiment.
Figure 5E:
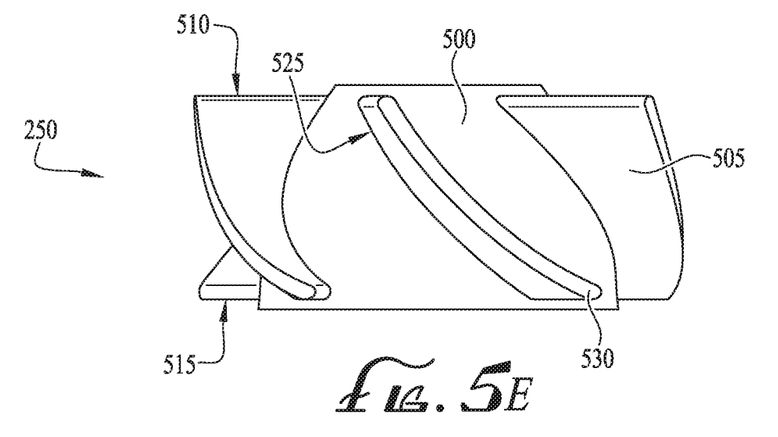
FIG. 5E is a side elevation view of a diffuser body of an illustrative embodiment.
Figure 5F:
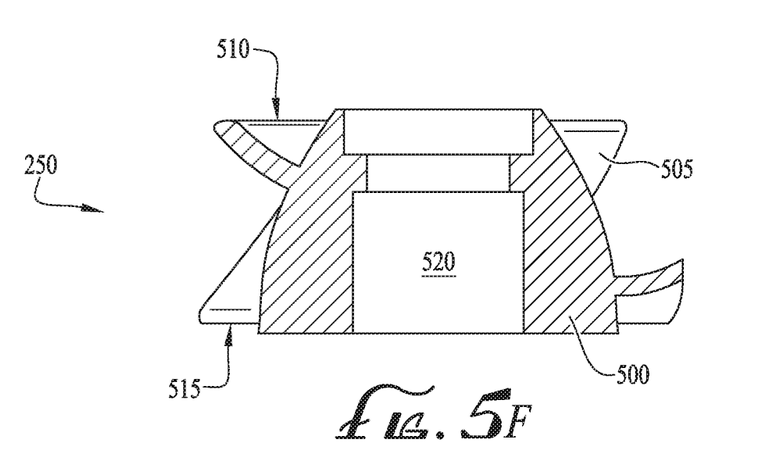
FIG. 5F is a cross-sectional view of a diffuser body of an illustrative embodiment.

Referring to FIG. 5E, each diffuser blade 505 may extend radially from blade inner edge 525 to blade outer edge 530. Blade inner edge 525 may be coupled to diffuser bowl 500 while blade outer edge 530 may be coupled to diffuser wall 260. Diffuser blade 505 inner edge 525 and outer edge 530 may have a crescent shape, similar to that of impeller 245 edges 465, 470. Turning to FIG. 5C, as a result of the curvature of bottom side 515 of diffuser blade 505, the arc length of blade outer edge 530 may be longer than that of blade inner edge 525. In this way, fluid prone to outward movement, for example higher-density, gas poor fluid, may be guided inward by the curved and/or scooped nature of diffuser blade 505.

Similar to vanes 405, 410, diffuser blades 505 may be characterized by pitch, slant, and/or curve, which characteristics may afford diffuser 250 and/or fluid moving stage 255 with the homogenization and fluid moving capabilities described herein. Diffuser blades 505 may include a top face with a concave shape tilted inward toward body 500, similar to that impeller main vane 405's top face. The top face may guide the higher density, gas poor fluid inwards, thereby preventing the buildup of lower density, gas rich fluid near diffuser body 500, while breaking up larger gas bubbles to beneficially homogenize the multi-phase fluid. Additionally, diffuser blades 500 may be sloped as they extend axially along diffuser body 500. Returning to FIG. 3, the slope of diffuser blades 500 may be substantially opposite and/or perpendicular to the sloped direction of impeller main vanes 405. As a result, each diffuser blade may extend axially along diffuser body 500 substantially parallel to and/or with the direction of fluid flowing from impeller 245, for example following flow stream 305 in FIG. 3.

In addition to the slope and concave face, each diffuser blade 505 may have a regressive pitch in mirror image to main vane 405. Referring to FIG. 5C, the pitch of each diffuser blade 505 may decrease continuously from bottom side 515 to top side 510 and may result in a "twisted" blade 505 shape. Such a twisted shape may provide blade 505 with an increasingly inward tilt as blade 505 progresses from bottom side 515 to top side 510. In this way, the inward tilt of diffuser blade 505's top face may vary in the axial direction. For example, blade 505's top face may tilt more inward near bottom side 515 than near top side 510. As a result, each blade 505 may induce inward fluid flow of higher density, gas poor fluid, which may beneficially homogenize the well fluid and reduce the buildup of lower density, gas rich fluid near diffuser body 500. In this way, diffuser 250 of illustrative embodiments may prevent gas lock in gas separator 125 while delivering more readily-producible fluid to pump 120.

During operation, multi-phase well fluid may enter gas separator 125 through intake 200 ports 115 and travel downstream to fluid moving stage 255, as shown in FIG. 3. Upon entering fluid moving stage 255, unhomogenized well fluid may enter impeller 245 and/or fluid mixer stage 255 through impeller inlet 300, located between main leading edges 435 of adjacent main vanes 405. Impeller 245 may accelerate well fluid upward following stream 305 toward diffuser 260, while inducing homogenizing turbulence, as described herein. From impeller 245, the accelerated well fluid may follow stream 305 into diffuser inlet 310, located between the bottom edges 515 of adjacent diffuser blades 505. The cavities formed between adjacent diffuser blades 505 may serve to guide the well fluid in substantially the same upward trajectory as induced by impeller 245, thus continuing and/or enhancing the fluid moving and homogenizing capabilities of impeller 245 while transforming axial acceleration into pressure head. As a result, well fluid flowing through fluid moving stage 255 may be both homogenized and maintain downstream momentum. The axially curving and tangential component of vanes 405, 410 may redirect higher density, gas poor fluid inward towards hub 400 as the fluid moves upward towards crossover 210. This inward flow of higher density, gas poor fluid may reduce the likelihood of gas locking by reducing buildup of lower density, gas rich fluid next to hub 400 (which lower density, gas rich fluid may otherwise undesirably expand to the outside edge of vanes 405, 410 leading to gas lock), and also homogenizes the fluids (making little bubbles out of big ones) which the pump can produce.

Illustrative embodiments may reduce and/or prevent the likelihood of gas lock inside the gas separator and centrifugal pump while increasing the production rate of both the gas separator and the ESP assembly. Illustrative embodiments may homogenize the well fluid, while facilitating downstream movement, which may improve the efficiency of the gas separator and increase the production rate of the ESP assembly. The homogenization and fluid moving capabilities of illustrative embodiments may be provided by the shape, size, curve, and pitch of impeller vanes and diffuser blades. Such features of illustrative embodiments may provide multi-phase fluid with a trajectory that homogenizes the well fluid and may prevent gas lock in the gas separator while facilitating downstream flow.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the scope and range of equivalents as described in the following claims. In addition, it is to be understood that features described herein independently may, in certain embodiments, be combined.

What is claimed is:

1. A fluid moving apparatus for an electrical submersible gas separator comprising:
   a rotatable shaft extending longitudinally through the gas separator;
   an impeller coupled to the shaft so as to rotate with the shaft inside a separation chamber of the gas separator, the impeller comprising:
   a funnel-shaped hub secured to the shaft;
   a plurality of impeller vanes, each of the plurality of impeller vanes having a concave top face tilted inward toward the hub, the plurality of impeller vanes further comprising:
   a plurality of main vanes extending along the hub with a first positive slope, the plurality of main vanes comprising a regressive pitch and a main vane chord length, the plurality of main vanes further comprising a cup on an outside edge of the leading edge;
   a plurality of mixer vanes interposed between the plurality of main vanes, each of the plurality of mixer vanes extending along the hub with a mixer vane chord length smaller than the main vane chord length, each mixer vane having a second positive slope larger than the first positive slope, each of the plurality of mixer vanes comprising a constant pitch;
   wherein the main vanes and mixer vanes alternate around the hub to form alternating acute angles between them;
   a non-rotatable diffuser paired to the impeller on a downstream side of the impeller, the diffuser comprising:
   a body, the body comprising a central aperture;
   a wall circumferentially enclosing the body; and
   a plurality of diffuser blades extending radially between the body and the wall, the plurality of diffuser blades having a concave face tilted inward, the plurality of diffuser blades comprising a regressive pitch mirroring the regressive pitch of the main vanes, the diffuser blades extending along the body with a slope opposite the first positive slope.

2. The fluid moving apparatus of claim 1, wherein there are a plurality of the impellers and a plurality of the diffusers on an upstream side of the separation chamber near an intake of the gas separator.

3. The fluid moving apparatus of claim 1, wherein two or more impeller-diffuser pairs are included in the separation chamber.

4. The fluid moving apparatus of claim 3, wherein the separation chamber comprises one of a vortex generator or a rotary generator.

5. The fluid moving apparatus of claim 4, wherein one of the vortex generator or the rotary generator is located downstream of the impeller and diffuser.

6. The fluid moving apparatus of claim 1, further comprising a centrifugal pump fluidly coupled to the gas separator on a downstream side, wherein the centrifugal pump receives substantially homogenized well fluid from the gas separator.

7. A fluid moving system comprising a gas separator between an electric submersible pump (ESP) and an ESP motor, the gas separator comprising a separation chamber comprising an impeller and a diffuser, the impeller comprising a plurality of regressively pitched main vanes interspersed between a plurality of mixer vanes, each of the plurality of main and mixer vanes extending along the hub with a positive slope and a concave top face, and a diffuser, the diffuser comprising blades extending along a diffuser body in a sloped direction substantially opposite the slope of impeller vanes, the blades having a concave top face and a regressive pitch substantially mirroring the pitch of the impeller main vanes.

8. The fluid moving system of claim 7, wherein the diffuser is above the impeller.

9. The fluid moving system of claim 7, wherein the impeller and diffuser facilitate downstream flow of well fluid through the separation chamber and crossover.

10. The fluid moving system of claim 7, further comprising a vortex generator downstream of the diffuser inside the separation chamber.

11. The fluid moving system of claim 7, wherein the impeller and diffuser homogenize the well fluid while facilitating downstream movement.

12. A fluid moving apparatus for an electrical submersible gas separator comprising:

a rotatable shaft extending longitudinally through the gas separator;
an impeller coupled to the shaft so as to rotate with the shaft inside a separation chamber of the gas separator, the impeller comprising:
a funnel-shaped hub secured to the shaft;
a plurality of impeller vanes, each of the plurality of impeller vanes having a concave top face tilted inward toward the hub, the plurality of impeller vanes further comprising:
a plurality of main vanes extending along the hub with a first positive slope, wherein the plurality of main vanes comprises a regressive pitch and a main vane chord length;
a plurality of mixer vanes interposed between the plurality of main vanes;
wherein the main vanes and mixer vanes alternate around the hub to form alternating acute angles between them;
a non-rotatable diffuser paired to the impeller on a downstream side of the impeller, the diffuser comprising:
a body, the body comprising a central aperture;
a wall circumferentially enclosing the body; and
a plurality of diffuser blades extending radially between the body and the wall.

13. The fluid moving apparatus of claim 12 wherein each of the plurality of mixer vanes extending along the hub with a mixer vane chord length smaller than the main vane chord length.

14. The fluid moving apparatus of claim 12 wherein the plurality of main vanes further comprises a cup on an outside edge of the leading edge.

15. The fluid moving apparatus of claim 12 wherein each mixer vane has a second positive slope larger than the first positive slope.

16. The fluid moving apparatus of claim 12 wherein each of the plurality of mixer vanes comprising a constant pitch.

17. The fluid moving apparatus of claim 12 wherein the plurality of diffuser blades have a concave face tilted inward.

18. The fluid moving apparatus of claim 12 wherein the plurality of diffuser blades comprise a regressive pitch mirroring the regressive pitch of the main vanes.

19. The fluid moving apparatus of claim 12 wherein the diffuser blades extend along the body with a slope opposite the first positive slope.

* * * * *